Jan. 20, 1953     K. L. BERNINGER ET AL     2,625,998
PROPELLER MECHANISM

Filed June 8, 1946     3 Sheets-Sheet 1

INVENTORS
KENNETH L. BERNINGER
JOHN F. HAINES
BY
Spencer, Hardman & Fehr
Their ATTORNEYS INVENTORS
KENNETH L. BERNINGER
JOHN F. HAINES
BY
Spencer, Hardman & Fehr
Their ATTORNEYS Jan. 20, 1953     K. L. BERNINGER ET AL     2,625,998
PROPELLER MECHANISM Filed June 8, 1946     3 Sheets-Sheet 3

INVENTORS
KENNETH L. BERNINGER
JOHN F. HAINES
BY
Spencer, Hardman & Fehr
Their ATTORNEYS Patented Jan. 20, 1953

2,625,998

UNITED STATES PATENT OFFICE 2,625,998

PROPELLER MECHANISM

Kenneth L. Berninger and John F. Haines, Dayton, Ohio, assignors to General Motors Corporation, Detroit, Mich., a corporation of Delaware Application June 8, 1946, Serial No. 675,391

10 Claims. (Cl. 170—160.21)

1

This invention relates to aircraft propellers, and has for an object to provide a propeller construction with variable pitch blades, which propeller construction is small, compact, simple of fabrication, from conventional structural elements, and provides propellers with variable pitch, at relatively low cost.

Another object of the invention is to provide a control means for a pitch shiftable propeller so that constant speed for take-off is assured by automatic governor mechanism, and high pitch blade setting is assured through a fixed angle for cruising flight.

Another object of the invention is to provide an automatic governor valve for a propeller controlling fluid circuit that will control the decreased pitch pressure.

Another object of the invention is to provide a flow sensitive valve to release fluid pressure when the pressure generating source becomes inoperative.

Another object of the invention is to provide a propeller with pitch shiftable blades, and a control mechanism for shifting the blades to either one of two positions by developing a fluid pressure to oppose the natural or inherent tendencies of the blades to shift to a predetermined position of pitch setting.

Further objects and advantages of the present invention will be apparent from the following description, reference being had to the accompanying drawings wherein a preferred embodiment of the present invention is clearly shown.

Figures 4, 5:
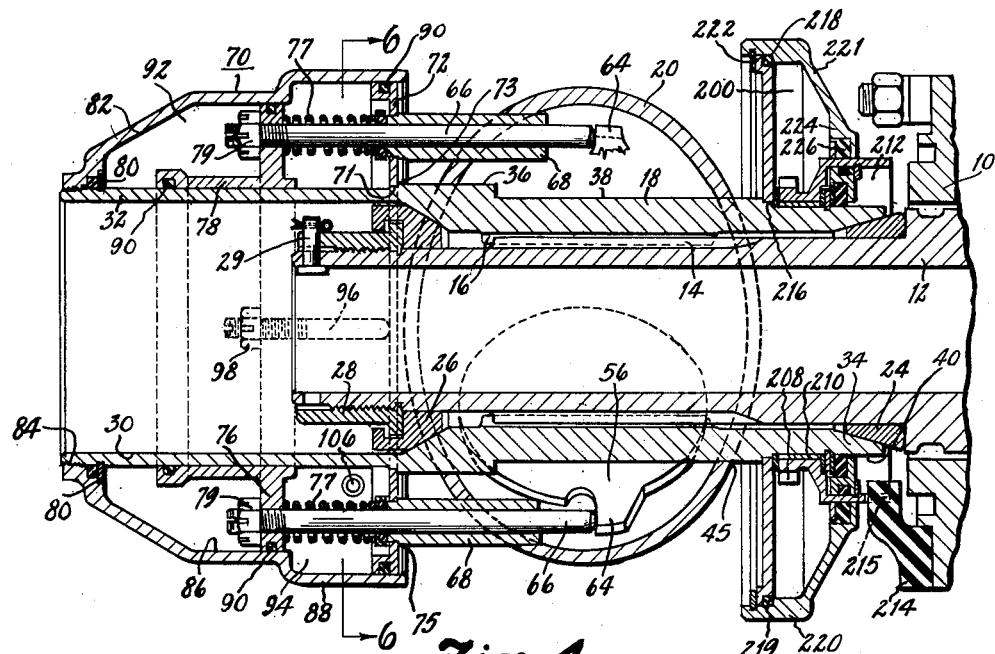
Fig. 4 is a sectional view through the propeller hub longitudinal of the driving shaft showing its support from the engine nosing or gear casing and disclosing means for continuously driving the power developing means when the propeller is rotating, the view being taken substantially as indicated by the line and arrows 4—4 of Fig. 2.
Fig. 5 is a similar sectional view but circumferentially displaced as indicated by the lines 5—5 of Figs. 2 and 6, so as to show the power developing means provided with the preferred form of means for selectively operating the power developing means and the governing means.

With particular reference to the drawings and first considering Fig. 4, 10 indicates a gear casing or engine nosing from which extends a hollow rotatable propeller shaft 12 splined at 14 to drivingly engage splines 16 of a propeller hub sleeve 18 provided with sockets 20 for pitch shiftably mounting propeller blades 22. The hub sleeve 18 usually seats upon a rear cone element 24 where it is maintained by a forward split cone 26 being thrust into position by a hub shaft nut 28 locked in secured relation by the usual lock pin 29. Contributing to this end the hub sleeve 18 provides appropriate conic shoulders receptive of the cones 24 and 26.

In practising the invention herein disclosed and claimed, the propeller hub is fabricated from standard tubular steel products which may comprise a predetermined length of tubular material for providing the hub sleeve 18 and a second tubular section which is machined and fabricated and joined to the tubular sleeve 18 to provide the socket members 20. Toward this end the interior of the sleeve 18 is machined to provide the rearward conic seat engageable with the cone ring 24 and the bore of the tube is otherwise fashioned to provide the splines 16 and the crown seat for the forward cone 26. An extension with a large bore 30 permits assembly and manipulation of the cone 26 and nut 28. The forward extension 32 provided by the enlarged bore 30 forms a support for an annular regulator later to be described, and a rearward tubular extension 34 provides support for a housing enclosing power developing means later to be described. Exteriorly, the tubular portion 18 is turned or machined to different diameters which may incorporate a maximum diameter as at 36 with an aft reduced diameter at 38 and a further reduction at 40 which extends to the rear of socket tube 20 over the rear cone 24 for the extension 34. Forwardly of the main diameter 36 the tube may be diminished in outside diameter by successive steps to provide the thin wall for 32. It will be noted that the greatest body of material in this tubular length is disposed over the interiorly splined section and at the portion shown to intersect with the tubular socket portion 20, see Figs. 4 and 5.

Figure 1:
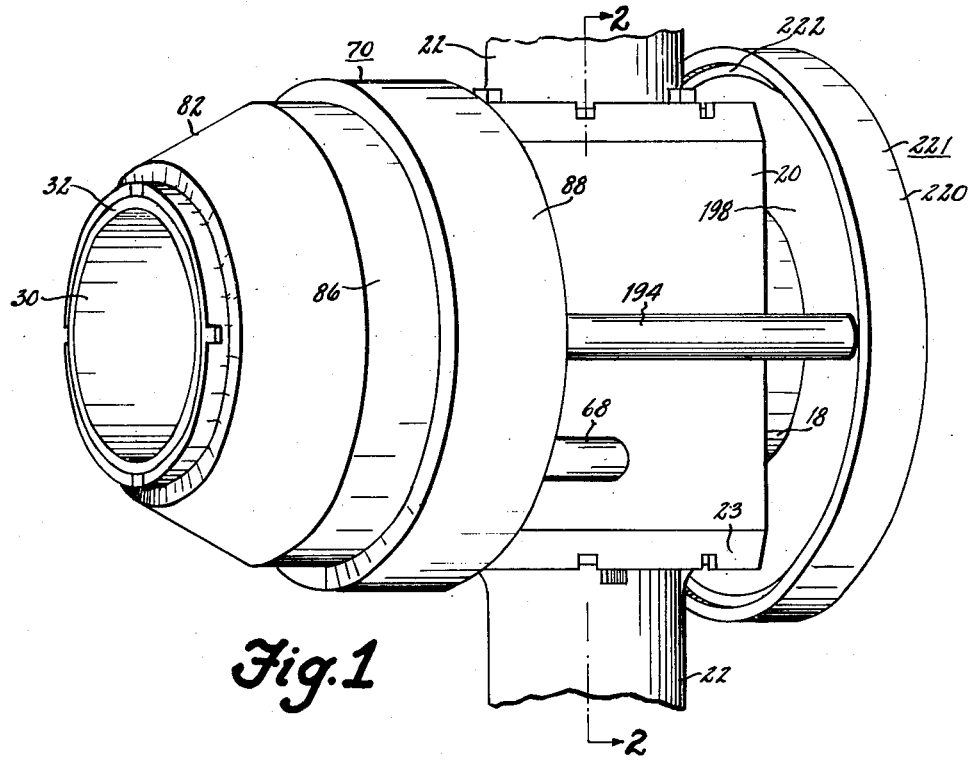
Fig. 1 is a perspective view of a propeller hub with blades attached that incorporates the instant invention.
Figures 2, 3:
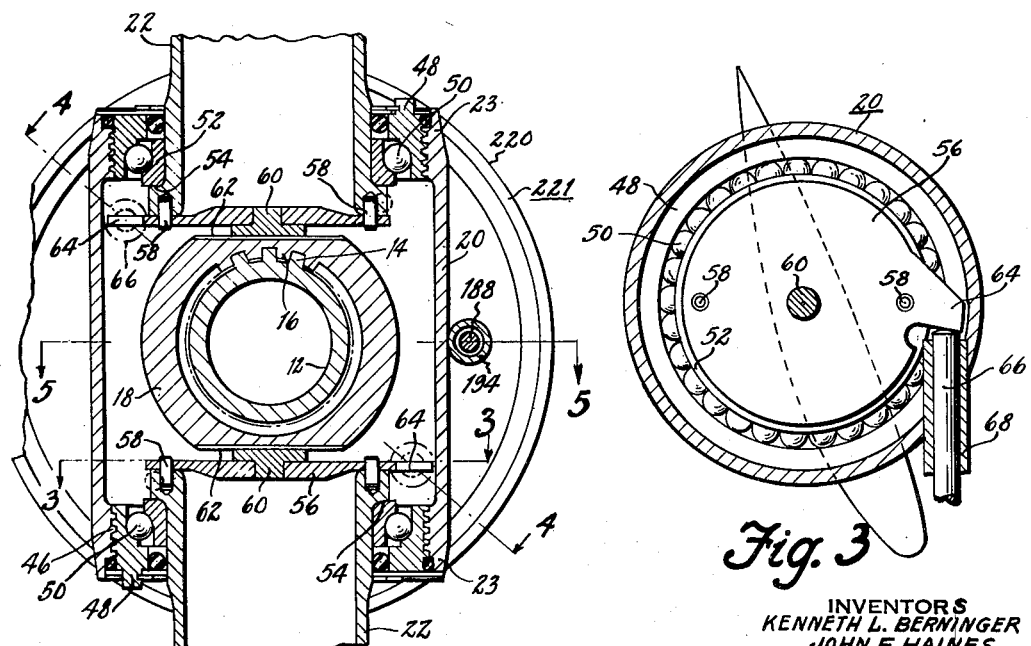
Fig. 2 is a transverse sectional view through the hub substantially as indicated by the line and arrows 2—2 of Figs. 1 and 5.
Fig. 3 is a section through the blade socket looking toward the root of the blade substantially as indicated by the line and arrows 3—3 of Fig. 2.

Working of the tubular portion 20 from a length of tubular stock incorporates bores transverse to the axis of the tube through which the portions 34, 36 and 38 of the tubular section 18 may be passed with a relatively tight fit. When that assembly is accomplished the parts may be secured together either by brazing, welding or such other furnace or heat treatment as will unite the tubular elements 18 and 20 into a rigid and substantially integral-like unit of structure. Thus, the tubes 18 and 20 will be securely bonded together at all junctures such as indicated at 45. As shown particularly in Fig. 2, tubular section 20 has its end portions 23 exteriorly tapered and interiorly threaded at 46 to engage a blade retaining nut 48 forming an outer race member for a blade bearing comprising balls 50 rolling upon an inner race 52 carried by the shank end of the blade 22 and seated against a flange or shoulder 54 of the blade. Closing the radially inward end of the blade 22 there is a head member 56 secured to the flange portion 54 in driving relation by means of dowels or the like 58 and a center piece 60 inwardly engages a flat 62 to bottom the blade against the tubular section 18. The head member 56 has a lateral extension or arm 64 adapted to engage a thrust rod 66 guided by a tubular sleeve 68 for altering the pitch of the blade as will presently be explained. Thus, it can be seen that the blades 22 are capable of rotation about their axes upon the bearings 50 upon the variation of forces applied to the lug 64.

Figure 7:
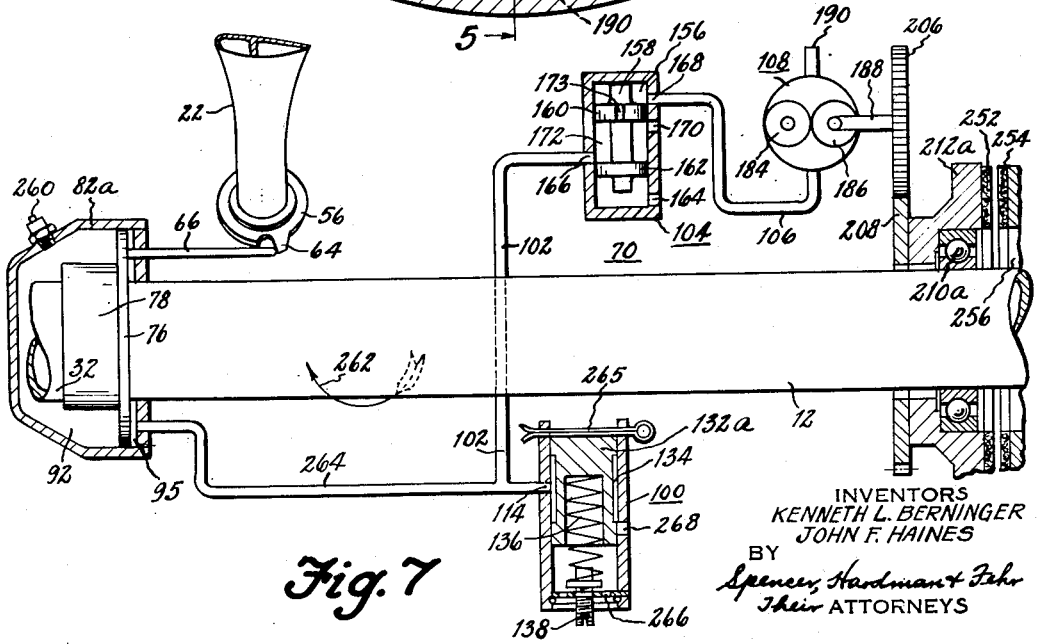
Fig. 7 is a schematic diagram illustrating the principle of operation and disclosing another form of means for selectively operating the power developing means.

In the instant propeller construction the blades 22 are so constructed with respect to their pitch changing axis that there is a normal tendency of the blade, upon propeller rotation, to turn upon its axis in a direction to increase pitch such as to maintain engagement with or to thrust against the end of the shift rod 66. That normal tendency may be built in provisions incorporating off-center weights, or attached counterweights as is well known in the art, or the provisions may result in sufficient sway-back of the blade that centrifugal force during propeller rotation tends to shift the blades on their pitch axis toward an increase pitch position, a method which is also known by those experienced in the art. On the other hand, as shown in Fig. 7, the normal tendency may be incorporated in the regulator where the chamber 92 is loaded with gas under pressure that tends to force the piston 76 to the right and operating through rods 66 to turn the blades 22 in an increasing pitch direction. Provision is made for moving the thrust rod 66 by incorporating a regulator on the forward end of the sleeve extension 32 as is generally indicated by the reference numeral 70. This is accomplished generally as indicated in Figs. 4 and 5, wherein an annular plate 72 fits over the tubular extension 32 and is seated against a shoulder 71 at the juncture with the larger diameter 36, where it is secured by welding, brazing or the like, as indicated at 73. Secured in the annular plate 72, such as to be properly aligned with the lug 64 of the blade header, there is mounted one end of the tubular sleeve 68 which forms the guide for the thrust rod 66, the tube 68 extending thru the side wall of the tubular section 20 where it is bonded or otherwise secured as indicated at 75. The push rod 66 extends forwardly of the annular plate 72 to securely and rigidly attach to a piston head 76 such as by means of a lock nut 79. Helical springs 77 encompassing the rods 66 and engaging between the annular plate 72 and the piston 76 operate thereby normally to move the piston toward the left as viewed in Figs. 4 and 5. The piston 76 incorporates a guide sleeve and stop member 78 which is slidable along the tubular extension 32 to engage a ring 80 secured about the forward end of the tubular extension 32. A cap member 82 threads upon the tubular extension 32 such as at 84 to engage the stop ring 80. The cap member incorporates a cylindrical portion 86 circumscribing the piston 76 and also has a skirt portion 88 embracing the periphery of the annular member 72. Fluid seal rings 90 are incorporated in the junctures of the tubular sleeve 32 and the cap member 82 and between the latter and the periphery of the annular member 72 as well as for the sliding engagement of the piston 76 on the tubular extension 32 and in cylinder wall 86. Thus, there is provided an annular chamber of fluidtight character that is embraced by the tubular parts 32, the cap member 82, and the annular member 72. This chamber is divided into two variable volume chambers 92 and 94 by the movable piston 76. For the purposes of convenience and subsequent reference 92 may be identified as the pressure chamber and 94 may be identified as the reservoir.

Engagement of the stop member 78 with the ring 80 defines the minimum volume of the pressure chamber 92, and the minimum volume of the reservoir 94 is determined by means of studs 96 threaded into the piston member 76 and locked in place by nuts 98, the free end of the studs 96 being located within the reservoir 94 and adapted to engage the annular member 72 for limiting the proximity of the piston 76 with respect to the annular member 72. One limit of the blade angle shift is thereby determined by the stud 96 since it determines the extent to which the rod 66 may push upon the lugs 64. The other limit of the blade shift range is determined by the engagement of the stop sleeve 78 with the ring 80. The spring 77 encompassing the rod 66 tends to move the piston 76 against the stop ring 80 thus reducing the resistance to the normal pitch shifting characteristic of the blade 22. If it is assumed that the natural tendencies built into the blades, and the contributing features of the regulator characterize a propeller construction in which the blades during propeller rotation have a tendency to automatically shift to a high angle position; then it will be observed that a reduced blade angle may be obtained by altering the relative volumes of the chambers 92 and 94. In the present instance, that alteration is effected by means of fluid pressure responsive mechanism provided by the regulator 70 substantially as shown by Figs. 5, 6 and 7.

Figure 6:
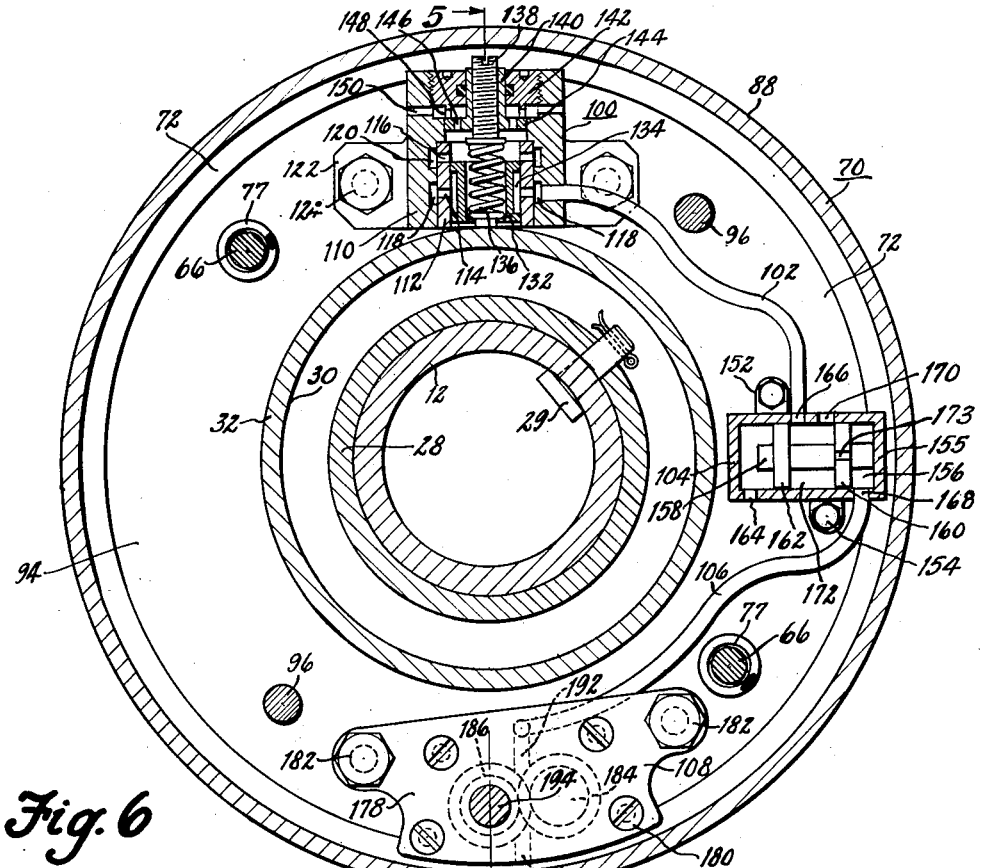
Fig. 6 is a sectional view through the regulator mechanism of the propeller substantially as indicated by the line and arrows 6—6 of Figs. 4 and 5.

The fluid pressure responsive mechanism herein disclosed see Figs. 5, 6 and 7 comprises a governor valve unit 100 connected by a fluid passage 102 with a flow sensitive valve 104 and thence by fluid passage 106 to a fluid pump 108 contained within the reservoir 94 and all rigidly mounted upon the annular plate 72 substantially as indicated in Fig. 6 and as schematically shown in Fig. 7. Referring to Fig. 6, the governor valve 100 comprises a chambered body 110 having a stepped bore receptive of a porting sleeve 112 that provides axially spaced ports 114 and 116 opening from the bore of the sleeve into channels 118 and 120 in a bore of the body 110. The body 110 is rigidly mounted upon the annular member 72 by means of apertured lugs 122 and screw devices 124. The channel 118 in the body opens into the fluid passage 102. As shown in Fig. 5 the channel 120 opens into a short length of tubing 126 one end of which is secured in the body 110 and is so disposed as to extend parallel with the axis of rotation and through an aperture 128 of the piston head 76 where it is surrounded by a gland 130 to reduce fluid flow between the piston head and the outside of the tube. It will thus be seen that the channel 120 is always in communication with the pressure chamber 92.

For controlling communication between the channels 118 and 120, and hence between the fluid passage 102 and the pressure chamber 92 there is a spool valve 132 that is slidable along the bore of the porting sleeve 112 and has a peripheral groove 134 adapted to bridge ports 114 and 116 when the spool valve 132 is in proper position. The spool valve is normally urged to a radially inward position by means of a spring 136 bottoming against a part of the spool valve and thrusting against an adjusting screw 138 mounted in the fixed sleeve 140 carried by a ring nut 142 threaded into the radially outer end of the bore of the body 110. The sleeve 140 incorporates a flange 144 fitting within the smallest bore of the body 110, the flange being apertured at 146 to provide passage of the exhaust fluid into a chamber 148 between the nut 142 and the flange 144 which opens by lateral bores 150 to the outside of the body 110 and hence into the reservoir 94.

From the foregoing it should be observable as shown in Figs. 5 and 6 that pressure applied to the passage 102 is always present in the annular groove 134 surrounding the spool valve. If the spool valve is shifted radially outward, which is the position it obtains by centrifugal force upon manifestation of a certain propeller speed, that fluid pressure around the waste of the fluid valve is also present at the ports 116, channel 120, tubular passage 126 and in the pressure chamber 92. The effect of that pressure will tend to enlarge the pressure chamber 92 causing the piston 76 to move to the right and as illustrated in Figs. 4 and 5 by sliding upon the tube 126 and by pushing the rods 66 against the lugs 64 of the blades, during the time compressing the springs 77 until the stop members 96 engage the head member 72. It should also be observable that when the spool valve 132 occupies the radial inward position as shown in Fig. 6 that the pressure chamber 92 is thence in direct communication thru the tube 126, annular groove 120, port 116, the bore of the porting sleeve 112, the apertures 146 of the flange 144, the chamber 148, and the lateral port 150 into the reservoir 94. The built-in characteristics of the blade 22, while the propeller is rotating, coupled with the tendency of the springs 77 tend to move the piston 76 toward the left and thereby to reduce the volume of the pressure chamber 92 which effects the drain of the fluid in that chamber thru the passages just described back into the reservoir 94.

The flow sensitive valve 104 is also mounted upon the plate 72 by means of the lugs 152 and screw devices 154 and incorporates a chambered body 155 with its longer axis disposed upon the radius of propeller rotation. A chamber 156 therein encloses a centrifugally responsive valve member 158 provided with spaced lands 160 and 162, the radially inward end of the casing 155 being opened at 164 to the reservoir 94 while the fluid passage 102 opens into the chamber 156 at 166 with the passage 106 opening into the end of the chamber at 168. The valve 158 is capable of freely moving from end to end of the chamber 156 and the lands are so spaced that an end face of the land 160 is always exposed to the fluid content of the passage 106 but may shift radially inward thereunder to close a port 170 that opens from the interior of the body to the reservoir 94, the port 170 being so positioned that it is in communication with the annular channel 172 separating the lands 160 and 162 when the pump is not operating, but is adapted to be closed by the land 160 when the pump delivery is applied against the end face of land 160. The land 160 is provided with a notch or restricted flow passage 173 that connects opposite sides of the land to permit a restricted or measured pump flow from the pump outlet 168 to the channel 172 between the lands and thence out the port 166 leading to the line 102 at all times. The cross section of the notch 173 is not large enough however but that there may be a balance between centrifugal force upon the valve 158 and pump pressure on the face of the land 160 so that a simulated regulator function, and sensitivity to both forces obtains when the pump is either started or stopped. Hence, when the valve 158 is in the radially outward position as shown in Fig. 6 the passage 102 is connected without obstruction to the exhaust port 170 and to the reservoir, and if the spool valve 132 of the governor valve is in the radially outward position, then the pressure chamber 92 is connected for drain-back into the reservoir thru the passage 102 and the exhaust port 170 of the flow sensitive valve. That is a condition that may ensue upon cessation of pump operation whereby no effective pressure is applied to the line 106, as will presently be explained. In this outward position of the valve 158 the end of the land 160 is always exposed to the pressure at the port 168, and if the pump 108 is operating then the force of the pressure in the chamber against the end face of land 160 will operate to shift the valve 158 radially inward against centrifugal force upon the valve due to rotation of the propeller. When that pressure overcomes the centrifugal force applied to the valve, the valve moves inward sufficient to close the port 170 and prevent return of the fluid to the reservoir. The port 166 is then open to pressure delivered by the pump into chamber 156 and notch 173 which flows to the groove 134 of the spool valve through 102, and thence on to the pressure chamber 92 as has been explained.

In actual construction the flow sensitive valve may be built into or attached to the governor valve 100 and if desired a pressure relief valve may be inserted in the line 106 between the pump and the flow sensitive valve. Where the pressure relief valve is used it should be set at a blow-off value far enough above the pressure potential required for shifting the blades to the low pitch position that the efficiency of the regulator mechanism will not be impaired.

On the other hand, the flow sensitive valve may be built into or incorporated as a part of the pump structure 108, which is here shown as a conventional intermeshing gear type of pump comprising a chambered body 174 and plates 176 and 178 clamped together by screw devices 180 and mounted upon the plate 72 by means of bolts and spacers 182. Intermeshing gears 184 and 186, the latter of which is mounted on a shaft 188 operate to draw fluid in through the intake 190 and deliver it to the outlet passage 192 which opens into the passage 106. Drive for the pump is provided by extending the shaft 188 rearwardly through a tubular housing 194 extending from the plate 72 outside of the hub barrel 20 to an annular head member 198 of the power developing means. A fluid seal 199 is provided in the end of the tubular housing 194 to prevent fluid leakage and bushings 204 provide bearings for the shaft 188 within the tubular housing 194. The aft end of the shaft 188 extending from the member 198 receives a driving gear 206 which meshes with a pump driving gear 208 journalled on the rear sleeve extension 34 thru the medium of a bearing bushing 210, the pump driving gear 208 being relatively fixed with the engine or casing 10 because of a flared skirt 212 engaging a stop such as 214. Thus, it will be observed that the rotation of the propeller causes the gear 206 to roll about the pump driving gear 208 when the latter is arrested against rotation.

The plate member 198 seats against a shoulder 216 of the rear hub extension 34 where it is secured by bonding or otherwise. The periphery of the plate 198 is channeled at 218 to receive a seal ring 219 engageable with a ledge in the rim 220 of a cover member 221 engaging about the periphery of the plate 198 and forming an annular chamber 200 enclosing the pump driving gear and which usually carries an appropriate amount of lubricant for satisfactory operation of the elements. A snap ring 222 operates to retain the cover 221 upon the plate 198. An inward extension 224 of the cover provides a seal ring 226 engageable with the skirt 212 to prevent loss of lubricant from the chamber 200. A shim 228 and a snap ring 230 operate to locate the bearing bushing 210 and pump driving gear 208, while a seal device 232 disposed within the skirt 212 is held in place by a snap ring 234 and prevents loss of lubricant from inside the pump driving gear.

So long as the pump driving gear 208 is held stationary, or so long as the propeller and the gear casing is caused to rotate relative to the pump driving gear, the pump 108 will effectively take up fluid from the reservoir 94 and discharge into the passage 106, flow sensitive valve 104 and passage 102 to the governor valve 100 and thence operate to shift the pitch of the blades as hereinbefore described. In Fig. 4 there is shown means by the fixed lug 214 for restraining the pump driving gear 208 from rotating whereby the pump 108 will be driven at all times that the propeller is rotating about the pump drive gear 208. In that instance, the lug 214 constantly engages within a notch 215 of the skirt 212. It is preferable however, that the pump drive gear 208 be selectively arrestable which may be accomplished by means shown in Fig. 5 wherein the skirt 212 has a peripheral flange 240 which is notched at 242 and adapted to receive a detent 244 carried by a bell crank 246 pivoted at 248 from some rigid part of the structure 10 and which bell crank may be rocked by means of a push-pull rod 250. By that construction rotation of the bell crank 246 in a clockwise direction withdraws the detent 244 from the notch 242 and permits the pump driving gear 208 to rotate with gear housing and consequently deliver no torque to the pump driving shaft 188. When it is desired to drive the pump, rotation of the bell crank 246 in a counterclockwise direction will drop the detent 244 into the notch 242 which will effectively hold the pump driving gear against rotation. As a consequence, the gear 206 rolling about the pump driving gear 208 effects operation of the pump. On the other hand, the selection of driving or nondriving of the pump 108 may be effected as suggested in Fig. 7, where the pump driving gear 208 is carried by a hub 212a journalled on the shaft 12 by an anti-friction bearing 210a. The hub 212a is provided with a brake surface 252 adapted to be engaged by a friction face 254 carried by an axially movable support 256. Obviously when the brake surfaces 252 and 254 are engaged the pump driving gear 208 will be arrested and the pump 108 caused to be operated. However, separation of the brake surfaces permits the pump driving gear 208 to rotate with the hub and consequently inactivates the pump 108.

Reverting to the assumption that the natural tendencies of the blade plus its operative connection with the control mechanism tend automatically to shift the blades to the high pitch position, a slight modification of accomplishing that end is illustrated in Fig. 7. The regulator here comprises the cap 82a mounted on the tube extension 32 as in the preceding instance and providing a cylindrical bore cooperable with the piston 76 attached to the stop sleeve 78 as heretofore. In this instance, the preloading chamber 92 is charged to a high potential with compressed air or an inert gas admitted thru the filler valve 260 and which operates upon the movable piston 76 constantly forcing it toward the right in Fig. 7 to push upon the rod 66 tending to rotate the blade element 64 in a counterclockwise direction so as to shift the blade 22 into a coarse pitch position as respects the rotation of the propeller, indicated by the arrow 262. While the valve mechanism and pump may still be located in the reservoir 94 as heretofore explained, the illustration of Fig. 7 combines the regulator 70 and the pump driving gear 208 as contained in the reservoir, all for the purpose of clearly illustrating the operation of the construction.

The flow sensitive valve 104 and the governor valve 100 are both disposed such that their active element 158 and 132a respectively are subject to radially outward movement in response to centrifugal force. The passage 102 connecting the flow sensitive valve with the governor valve has been shown as joining a passage 264 leading to piston chamber 95. The governor valve 100 here shown as a tubular casing provides the port 114 to which the passage 102 is connected and a spool valve 132a is kept within the tubular casing by a bar or pin 265 at the radially inward end and by an apertured disc 266 at the outer end, the latter of which supports the adjustable spring support 138 similar to that heretofore described. The peripheral groove 134 is always in communication with the port 114 and is adapted upon radially outward shifting of the valve 132a to connect 114 with the lateral port 268 opening into the reservoir.

A propeller constituted as herein disclosed provides a simple construction for a two-position condition of operation whereby the governor mechanism operates to control the blade for constant-speed operation at take off, and further provides for maximum pitch angle for cruising speed. With the propeller at rest or nonrotating the pump will be nonoperative and there will be no pressure potential in the regulator to move the piston 76 toward the low pitch position. With respect to Figs. 4 to 6 the fluid in the chamber 92 will have drained into the reservoir 94 while with respect to Fig. 7 the preloading of the air or gas in the chamber 92 will have collapsed the chamber 95. In either event the blades 22 will have moved to their maximum pitch position. Upon driving of the propeller thru rotation of the shaft 12, the pump 108 produces pressure against the end face of the land 160 of the flow sensitive valve, and as soon as that pressure becomes great enough to overcome the centrifugal force exerted upon valve member 158 then the passage 102 is connected directly with the pump source which exposes the output of the pump to the governor valve 100. Centrifugal force operating upon the governor valve 100 of Figs. 4 to 6 if great enough connects the fluid passage 102 with the port 116 so that the chamber 92 is charged with pressure which effects movement of the piston 76 toward the right with a consequential rotation of the blades 22 in a pitch decreasing direction which is proper for take off and climb. According to Fig. 7 the governor valve 100 operates to deliver the pressure from the pump to the chamber 95 until such time as centrifugal force operative upon the valve member 132a opens a communication between ports 114 and 268. The parts are so constituted that it does not occur until the chamber 95 has been substantially filled with fluid to compress the chamber 92 permitting pitch shift of the blades 22 to a small angle suitable for take off and climbing. With the occurrence of a smaller angle of blade pitch the driving engine speeds up because of the lesser load and consequently drives the propeller at a faster rate, centrifugal force acting upon the valve member 132 moves it radially outward so as to connect the ports 114 and 268, which allows the compressed air or gas in the chamber 92 to dominate and increase the pitch of the blade.

Upon attaining the position aloft desired the means holding the pump driving gear against rotation is released which causes cessation of operation of the pump with a consequent diminution of pressure in the pressure line and which permits the blade in both instances to shift to the greatest angle of its range. Increasing the pitch of the blade immediately slows down the rotating speed of the propeller lessening the centrifugal effect upon the speed responsive elements such that the flow sensitive valve is allowed to connect the ports 166 and 170 and the governor valve is permitted to open the drain ports into the reservoir. When the brake of the device is applied, such that the pump is operated, then the regulator mechanism operates upon the blade to maintain constant speed. When the arresting device for the pump driving gear is released, the pump becomes inoperative and the propeller blades automatically shift to the high pitch position which is suitable for cruising.

While the embodiment of the present invention as herein disclosed, constitutes a preferred form, it is to be understood that other forms might be adopted, all coming within the scope of the claims which follow.

What is claimed is as follows:

1. A pitch shiftable propeller, comprising in combination, a hub sleeve adapted to be rotated by a shaft and having fore and aft tubular extensions, a socket sleeve adapted to rotatably support propeller blades for pitch shifting movement, said socket sleeve having a transverse bore receptive of the hub sleeve and bonded thereto such that the ends of the socket sleeve extend radially from the bore of the hub sleeve, and such that the tubular extensions of the hub sleeve extend fore and aft of the socket sleeve, a pair of annular plates secured about the hub sleeve extensions adjacent the socket sleeve, a pair of hollow cap members secured one about each annular plate and hub sleeve extension to cooperate with the respective sleeve extension and annular plate to provide annular chambers fore and aft of the socket sleeve, an annular piston movable within the fore chamber, means connected with the piston for rotating the pitch shiftable blades, fluid pressure responsive means within the fore chamber for moving fluid from one side of the piston to the other side thereof, and means in the aft chamber and extending into the fore chamber for activating the pressure responsive means.

2. The combination set forth in claim 1 wherein the means for activating the pressure responsive means includes a sleeve relatively rotatable with respect to the aft chamber and a fluid pump, said sleeve extending into the aft chamber and driving said pump.

3. In a shiftable pitch propeller having blades tending to shift to the pitch increase position when the propeller is rotating, the combination comprising, a casing on the propeller providing an annular cylinder circumscribing the axis of propeller rotation, an annular piston movable within the cylinder dividing it into a reservoir and a pressure compartment, said piston having mechanical linkage with the blades to be moved thereby, a governor valve mounted on the casing inside of the reservoir, passage means secured to the valve and slidably extending through the piston to communicate with the pressure compartment and the governor valve, a fluid pressure pump carried by the casing within the reservoir and having fluid connection with the governor valve, a flow control valve inserted in said connections for connecting and disconnecting the pump delivery to the governor valve and reservoir, and selectively operable means for operating the pump upon rotation of the propeller, whereby operation of the pump forces fluid under pressure to flow through the governor valve to the pressure compartment for opposing the tendency of the blades to shift to the pitch increase position.

4. The combination set forth in claim 3, wherein the flow control valve includes a casing and plunger disposed radially of the reservoir, said plunger having an end face exposed to the flow from the pump in opposition to centrifugal force acting upon the plunger.

5. In a variable pitch propeller, a hub supporting a plurality of blades for pitch shifting movement and having tubular extensions fore and aft of the blades, a casing mounted on and cooperating with the fore extension to provide an annular regulator, an annular piston movable within the regulator to divide the chamber enclosed by the casing and fore extension into a reservoir and a pressure chamber, a fluid pressure pump and control valves mounted within the reservoir, passage means extending from one of the control valves into the pressure chamber, a casing mounted on and cooperating with the aft extension to provide a gear casing, a ring gear journalled within the second mentioned casing and having a flange extending without the said casing, means for arresting and releasing the ring gear for selective rotation with respect to the gear casing, transmission means connecting the ring gear in the gear casing with the pump in the reservoir of the first mentioned casing, a tubular housing joining the fore and aft casings to enclose the transmission means, and thrust means connecting the piston with the blades so that movement of the piston is transmitted to pitch shifting movement of the blades.

6. The combination set forth in claim 5, wherein the control valves include ported casings with movable plungers responsive to centrifugal force normally tending to open the pressure chamber to drain back to the reservoir, and one of said control valves being a flow sensitive valve responsive to pump operation for closing the drain back to the reservoir and for connecting the pump delivery to the pressure chamber so that the blades may be shifted in pitch during the pump operation.

7. The combination set forth in claim 5 wherein the control valves include a governor valve interconnected with a flow sensitive valve and responsive to increase of centrifugal force effecting a decrease of blade pitch, said flow sensitive valve including a centrifugally responsive element tending to connect the pump outlet to the reservoir, and sensitive to pump output for closing the outlet to the reservoir and for connecting the pump output to the pressure chamber, for decreasing the blade pitch.

8. In a controller for aircraft having a propeller with pitch shiftable blades normally seeking an increased pitch position, the combination including, a chamber attached to said propeller and rotatable therewith, a movable partition separating the chamber into a pressure compartment and a reservoir compartment, means connecting the partition with the pitch shiftable blades and responsive in movement to movement of the blades in a pitch shifting sense, valve means mounted on one wall of the reservoir compartment for controlling the flow of fluid from one compartment into the other, pressure developing means mounted on one wall of the reservoir compartment and rotatable therewith for applying fluid under pressure to the valve means, drive means operatively connected to said pressure developing means for operating the same upon relative rotation between said drive means and said compartment and selecting means including releasable rotation restraining means operatively connected to said drive means and mounted on non-rotatable structure for rendering the pressure developing means operative and inoperative, said valve means when the pressure developing means are rendered operative governing the flow of pressure fluid to and from the pressure compartment.

9. The combination set forth in claim 8 wherein the releasable rotation restraining means includes a rotatably journalled member having a notched flange that is adapted to be engaged by a non-rotatable detent member to thereby render the fluid pressure developing means operative.

10. The combination set forth in claim 8 wherein the releasable rotation restraining means includes a rotatably journalled member having a friction surface that is adapted to be engaged by a non-rotatable friction surfaced member to thereby render the fluid pressure developing means operative.

KENNETH L. BERNINGER.
JOHN F. HAINES.

REFERENCES CITED

The following references are of record in the file of this patent:

UNITED STATES PATENTS

| Number | Name | Date |
|---|---|---|
| 2,019,966 | Havill | Nov. 5, 1935 |
| 2,023,785 | Hoover | Dec. 10, 1935 |
| 2,032,254 | Caldwell | Feb. 25, 1936 |
| 2,229,058 | Dicks | Jan. 21, 1941 |
| 2,243,852 | Caldwell et al. | June 3, 1941 |
| 2,257,126 | Rindfleisch | Sept. 30, 1941 |
| 2,304,153 | Di Cesare | Dec. 8, 1942 |
| 2,307,102 | Blanchard et al. | Jan. 5, 1943 |
| 2,324,625 | Hoover | July 20, 1943 |
| 2,353,773 | Unterberg | July 18, 1944 |
| 2,404,290 | Hoover | July 16, 1946 |
| 2,420,424 | Hackethal | May 13, 1947 |
| 2,425,261 | Murphy | Aug. 5, 1947 |
| 2,476,638 | Stuart et al. | July 19, 1949 |
| 2,501,432 | Booth | Mar. 21, 1950 |
| 2,527,022 | May et al. | Oct. 24, 1950 |

FOREIGN PATENTS

| Number | Country | Date |
|---|---|---|
| 134,258 | Great Britain | Oct. 30, 1919 |
| 635,992 | Germany | Sept. 30, 1936 |
| 480,747 | Great Britain | Feb. 25, 1938 |
| 703,319 | Germany | Mar. 6, 1941 |